United States Patent [19]

Booe

[11] 4,081,397

[45] Mar. 28, 1978

[54] DESICCANT FOR ELECTRICAL AND ELECTRONIC DEVICES

[75] Inventor: James M. Booe, Indianapolis, Ind.

[73] Assignee: P. R. Mallory & Co. Inc., Indianapolis, Ind.

[21] Appl. No.: 204,737

[22] Filed: Dec. 3, 1971

Related U.S. Application Data

[63] Continuation of Ser. No. 887,307, Dec. 22, 1969, abandoned, which is a continuation-in-part of Ser. No. 631,241, Apr. 17, 1967, abandoned.

[51] Int. Cl.$^2$ .............................................. C09K 3/10
[52] U.S. Cl. .................................... 252/194; 252/428; 252/475; 260/37 SB; 260/746
[58] Field of Search ...................... 252/194, 475, 428; 260/41 B, 37 SB, 746

[56] References Cited

U.S. PATENT DOCUMENTS 3,261,801   7/1966   Wormuth ..................... 260/37 SB

OTHER PUBLICATIONS

Condensed Chemical Dictionary, Reinhold, 1961, pp. 128 and 338.

Primary Examiner—Benjamin R. Padgett
Assistant Examiner—Irwin Gluck
Attorney, Agent, or Firm—Hoffman, Meyer & Coles

[57] ABSTRACT

A composition of matter is provided of alkaline earth oxides in an elastomeric matrix to be used for stabilizing the electrical and electronic properties of electrical and electronic devices.

10 Claims, 4 Drawing Figures

U.S. Patent    March 28, 1978    4,081,397
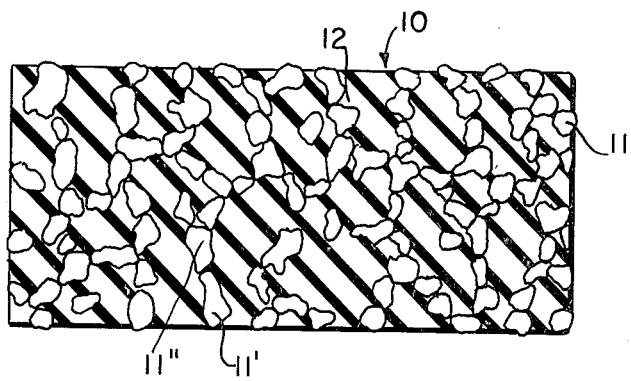
FIG. 1
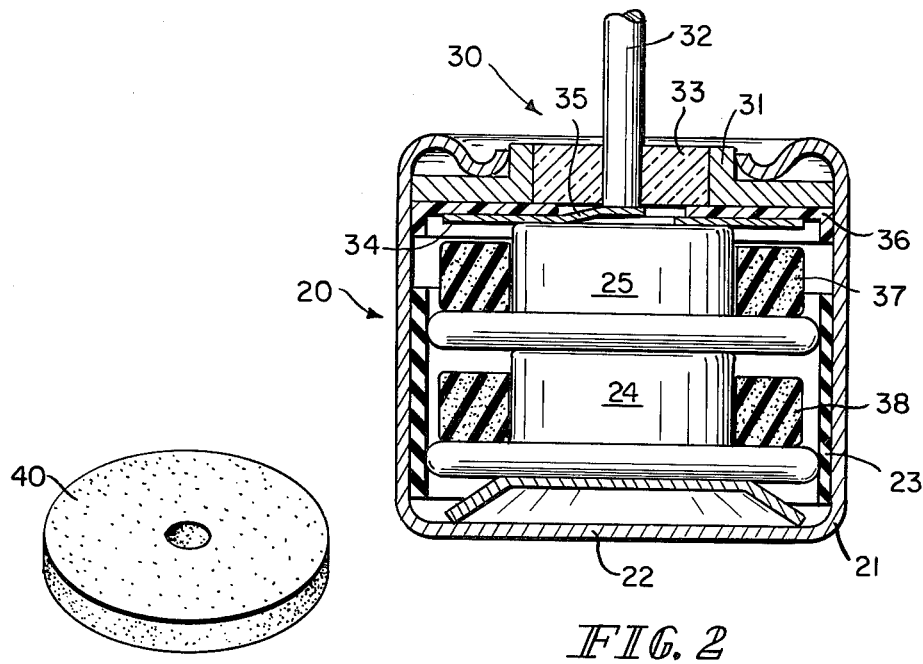
FIG. 2
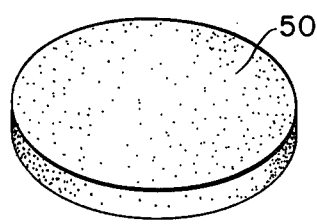
FIG. 3
FIG. 4

DESICCANT FOR ELECTRICAL AND ELECTRONIC DEVICES

This application is a continuation of application Ser. No. 887,307, filed Dec. 22, 1969, now abandoned, which was in turn a continuation-in-part of application Ser. No. 631,241, filed Apr. 17, 1967, now abandoned.

It is known, in order to be operational for their intended purpose, certain types of electronic devices must be hermetically sealed. Perhaps, the best known of the aforementioned types of electronic devices is the vacuum tube. Other types of electronic and electrical components such as resistors, capacitors, relays, switches, coils, transformers, rectifiers, transistors, integrated circuits, refrigeration systems, gyroscopes, other types of electromechanical devices, other types of semiconductor devices, batteries and the like function acceptably in certain environments under certain operating conditions without requiring encapsulation in an hermetic enclosure. However, it is known that the aforementioned electronic and electrical components have more stable operating characteristics and possess significantly increased operational life when properly protected from the ambient atmosphere. True hermetic sealing of the electrical or electronic components can provide a controlled environment in which the electrical or electronic devices function, however, a true and effective hermetic seal is difficult to achieve in all cases.

In the specialized case of vacuum tube and lamp manufacture, special methods are employed to insure the complete removal of all traces of water vapor and air before the final closure is made. In addition to the very high vacuum, elevated temperatures and other means are employed to accomplish this end. In the case of other devices when sealed in gasketed enclosures or in hermetic enclosures, the use of vacuum, heat and other agents are seldom employed. Consequently, ambient air is sealed within the enclosure and unless special precautions are taken, the air within the enclosure contains varying amounts of water vapor. Additionally, there is an invisible film of water adsorbed over the surfaces of the device and the walls of the container and the film of water becomes sealed within the container when the final closure is made. The amount of the water is a function of the temperature and the amount of water vapor in the atmosphere or the relative humidity. Furthermore, many devices contain organic materials for insulation and the like and nearly all such materials contain small amounts of water which are absorbed from the air. By using the conventional methods in enclosing the devices, it will be seen that water as vapor and adsorbed films will be sealed within the enclosure. This will produce deleterious effects on the operation of most devices as is commonly recognized by those skilled in the art. By effectively incorporating a powerful desiccating agent such as one of the alkaline earth oxides within the enclosure, substantially all the water will be eliminated. However, due partly to the nature of these materials, generally existing as hard lumps or powder, there are problems in their practical use as will be pointed out below. Due to their extreme avidity for water, the mere subjection of the alkaline earth oxides to the ambient air for even a short length of time results in the oxides absorbing high percentages of water vapor present in the ambient air thereby reducing their effectiveness as a desiccant within the hermetic enclosure. It is seen that careful handling of the alkaline earth oxide prior to and during its introduction into the enclosure is necessary.

It is seen that not only should water vapor be removed from the enclosure but also any volatile acidic compounds which become active at elevated operating temperatures should be sequestered. This the alkaline earth oxides do. Sources of the acidic compounds are soil from handling, solder flux residue and the like.

The alkaline earth oxide desiccants have several properties which are important. One of the most important of these properties is that they are solid materials rather than liquids, that they are electrically nonconductive and remain so even after hydration, that they are among the most powerful desiccants, that they are alkaline in nature and as such possess the property of sequestering deleterious acidic gases and vapors such as carbon dioxide, and that when subjected to elevated temperatures they retain their desiccating property.

However, other physical characteristics of the alkaline earth oxides make their use as a desiccating means difficult at best and in some instances impossible. For example, the use of the alkaline earth oxides in a powder form in electromechanical devices is precluded because the individual particles foul bearings, gears, and other movable elements such as the electrical contacts. In addition, movement of the individual particles may damage sensitive electrical and electronic elements when the elements are subjected to shock, vibration or both. The nature of the alkaline earth oxides present the problems in handling, particularly in measuring determined amounts and introducing the determined amounts of the alkaline earth oxide into miniature devices. For example, the alkaline nature of the metal oxide presents a hazard in handling due to its strong irritating effect on the skin and mucous membranes of a human. As disclosed before, the alkaline earth oxides have a tremendous affinity for water vapor carried by the ambient air so that during normal handling much or substantially all of the desiccating capacity of the alkaline earth oxide may be lost. This is especially true during the handling of small quantities of the alkaline earth oxide powder when the ambient humidity is high.

The present invention makes use of a composition of matter whereby the outstanding desiccating capacity of the alkaline earth oxides such as for example, barium oxide, strontium oxide, and calcium oxide are substantially preserved during handling in ambient conditions and means are provided so as to overcome the other shortcomings of the oxide generally outlined above thereby making the alkaline earth oxides extremely useful desiccant agents for removing and stabilizing the atmosphere in which the electronic and electrical components function thereby providing a more stable component.

Therefore, it is an object of the present invention to provide an elastomeric desiccant that may be easily and conveniently manufactured at low cost without affecting the desiccating capacity of the desiccant.

A further object of the present invention is to provide an elastomeric desiccant having an elastomeric binder that expands with the alkaline earth oxide as the oxide absorbs water vapor or moisture so that the elastomeric desiccant will not rupture or flake.

Another object of the present invention is to provide an elastomeric desiccant which can be molded into substantially any shaped desired thereby facilitating placement of the desiccant within the hermetic enclosure.

Another object of the present invention is to provide an elastomeric desiccant means which does not become brittle or fracture at temperatures as low as −55° C. and capable of withstanding temperatures as high as 250° C. for periods of time in excess of several thousand hours.

Another object of the present invention is to provide an elastomeric desiccant means which has a resilient nature so that said desiccant means may be positioned in close proximity to moving and/or delicate parts without causing physical damage thereto during normal operation and during operation in which the device is subjected to shock and/or vibration.

Yet still another object of the present invention is to provide an elastomeric desiccant means that has very high resistivity even after absorbing large amounts of moisture, water vapor, and acidic gases.

Still another object of the present invention is to provide an elastomeric desiccant means having a surface or surfaces to which an adhesive material may be applied so that the adhesive material will retain the elastomeric desiccant means in a predetermined position within a gasketed or hermetically sealed enclosures.

Yet still another object of the present invention is to provide an elastomeric desiccant means which efficiently and effectively controls the rate at which the alkaline earth oxide component thereof absorbs water vapor, moisture and acidic gases.

A further object of the present invention is to provide an elastomeric desiccant means including means which retards the rate at which the alkaline earth metal oxide reacts with water vapor, moisture and acidic gases.

Another object of the present invention is to provide an elastomeric desiccant means in which the initial viscosity of the liquid medium carrying the alkaline earth oxide may be regulated over a wide range allowing quick and efficient casting of the desiccant means within the confines of the gasketed or of the hermetic closure or in suitable molds.

Yet another object of the present invention is to provide an elastomeric desiccant means in which the effective life thereof may be regulated by judicious choice of the carrier medium.

Still another object of the present invention is to provide an elastomeric desiccant means which will absorb all acidic contaminants and carbon dioxide present or generated by the component contained within the gasketed or the hermetic enclosure.

A further object of the present invention is to provide an elastomeric desiccant means which does not liberate a gas or gases when water vapor or other deleterious gases present within the gasketed or the hermetic enclosure react with the alkaline earth oxide of the desiccant means.

Another object of the present invention is to provide an elastomeric desiccant means which will retain water vapor absorbed thereby at temperatures which exceed the operating temperatures of the electronic or electrical components.

A further object of the present invention is to provide an elastomeric desiccant means having an initial liquid medium carrying an alkaline earth oxide which when located within the confines of a housing for an electronic or electrical device solidifies and thereby adheres to the side walls of the housing and/or the device.

Another object of the present invention is to provide a means of handling the alkaline earth oxide desiccants which is non-irritating to persons handling same.

Another object of the present invention is to provide an elastomeric desiccant means which has an extremely high desiccating property.

A further object of the present invention is to provide an elastomeric desiccant means which will not liquify and which will not become electrolytic in nature when the desiccating means absorbs moisture.

Yet another object of the present invention is to provide an elastomeric desiccant means which is simple in construction, reliable, economical to manufacture and lightweight.

The present invention, in another of its aspects, relates to the novel features of the instrumentalities of the invention described herein for teaching the principal object of the invention and to the novel principles employed in the instrumentalities whether or not these features and principles may be used in said objects and/or in the said field.

With the aforementioned objects enumerated other objects will be apparent to those persons possessing ordinary skill in the art. Other objects will appear in the following description, appended claims and appended drawings. The invention resides in the novel construction, combination, arrangement, and cooperation of elements as hereinafter described and more particularly as defined in the appended claims.

The appended drawings illustrate an embodiment of the present invention constructed to function in the most advantageous modes devised for the practical application of the basic principles described in the hereinafter described invention.

In the drawings:

FIG. 1 is an enlarged cross-sectional view of an alkaline earth oxide dispersed in an elastomeric solid medium.

FIG. 2 is a cross-sectional view of an hermetically sealed closure containing an electronic component showing the relative position of the elastomeric desiccating means within said closure.

FIG. 3 shows a disc shaped elastomeric desiccant means having an axial aperture for inter-fitting with a terminal lead.

FIG. 4 shows an elastomeric desiccant means used for either overlying or underlying an electronic component contained within a hermetic enclosure (not shown).

I have found that by incorporating one or more of the alkaline earth oxides in a flowable liquid which has the property of converting to an elastomeric solid, produces an elastomeric member which has the property of expanding without rupture or disintegration when moisture is absorbed by the oxide. Another desirable property resulting from this combination is that the speed of desiccation of the oxide is moderated by the elastomer to the extent that it has a high degree of practical utility. This moderation of the speed of desiccation does not in any way impair the amount of moisture the desiccant oxide will absorb. The precursor liquid constituent must not be of high viscosity otherwise the amount of oxide which can be mixed therein is restricted and long mixing times such as in a rubber mill may be involved which would excessively expose the oxide to the humidity of the atmosphere, thus converting some of the oxide to hydroxide with an equivalent loss in desiccating capacity.

The object is to employ a liquid which has a sufficiently low viscosity that the alkaline earth oxides can quickly be stirred in, then either be deposited in place for conversion to an elastomeric solid or be quickly poured into molds, cured to an elastomer by heat, then transferred to storage in a substantially moisture free atmosphere for future use. Accordingly, it is necessary that the viscosity of the starting liquid be limited to enable quick mixing-in of the oxide powder and completion of the operation such as molding, casting, or dispensing in place, and to enable incorporating a large amount of the oxide in the elastomer, to not greater than about 50,000 centipoises.

It has been found that if the viscosity of the starting material is much above 30,000 centipoises, to say 50,000 centipoises, then mixing by quickly stirring in is sufficiently difficult as to be impractical and the amount of oxide possible to stir in is usually limited to only about 5-10%. If the viscosity of the starting liquid is in the range of 20,000-30,000 centipoises, then it is feasible to mix in an equal weight of the oxide, particularly barium oxide, yielding a flowable composition which can be poured into molds. Although starting liquids having viscosities in this range can be used, it is preferred that the viscosity be down in the range of 5,000-10,000 centipoises. Viscosities in this range permits as much as 75% alkaline earth oxide in the resulting elastomer.

Although virtually any liquid material having a viscosity preferably below 50,000, preferably below about 30,000 centipoises, and capable of being converted to an elastomeric body can be used, the materials found to be highly suited to this application are:
1. silicone potting and encapsulating materials,
2. silicone RTV (room temperature vulcanizing) rubbers,
3. vinyl plastisols, and
4. polyurethane rubbers.

The silicone compositions are especially good where use at such elevated temperatures as 150° to 250° is required. Another material, flexible epoxy resin compositions, may have application where the loading with the oxide is rather low, such as 10%; however, much above this the elastomeric strength properties of many epoxy resin systems are inadequate to withstand the expansion of the desiccant oxide when it absorbs moisture.

The silicone potting and encapsulating resins are perhaps the best choice for the elastomeric component of the desiccant. These materials have low starting viscosities generally in the range of 4,000 to 8,000 centipoises and the cured materials will withstand temperatures as high at 250° C even in a confined space whether or not they contain an alkaline earth oxide. These are siloxane type materials and conversion from the liquid to the elastomeric form is accomplished by means of a catalyst and/or co-reactant. One reaction is the addition of silane hydrogen on one chain to a vinyl group on another, e.g.

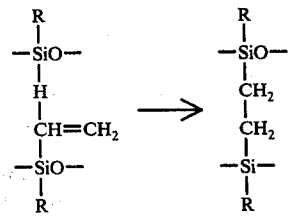

usually promoted by a metallic compound.

Commercial examples of potting and encapsulating resins would be represented by Dow Corning Corporation "Sylgard" 182 which has a viscosity in the liquid or uncured state of 4,000-6,500 centipoises at 25° C. A similar and applicable material is "Sylgard" 183 which has a viscosity in the liquid uncured state of 8,000-11,000 centipoises at 25° C. Still other applicable materials are "Sylgard" 185 which has a viscosity in the liquid or uncured state of 8,000-11,000 centipoises at 25° C, and "Sylgard" 184, which has a viscosity in the liquid or uncured state of 4,000-6,500 centipoises. All of these materials are characterized by (1) ability to withstand temperatures as high as 250° C in their cured condition, (2) curing in a few hours at room temperature or as quickly as less than 15 minutes at 150° C, (3) freedom from depolymerization when heated in a confined space either alone or with an alkaline earth oxide, and (4) excellent electrical properties.

The RTV rubbers are applicable materials being somewhat similar to the silicone potting resins however they are generally higher in viscosity due to the nature of the base liquid and the presence of a filler. There are various curing mechanisms but one common method is to effect condensation between silanol and silane alkoxy groups, e.g.

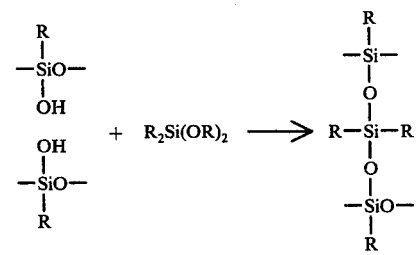

frequently promoted by means of an organometallic component such as dibutyl tin dilaurate or stannous octoate.

Commercial examples of suitable RTV rubbers are Dow Corning 3110, 3112 and 3120 RTV Encapsulates which have room temperature viscosities ranging from 12,500 to 30,000 centipoises.

Another suitable type of elastomer are the polyurethane rubbers. These compositions cure by reaction of isocyanate groups with reactive functional groups such as hydroxyl, carboxyl, amine and the like. The reaction between isocyanate and hydroxyl groups is an addition across the isocyanate groups:

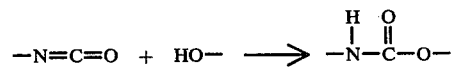

The nature of the resultant cured product may range from hard to very soft depending upon the structure of the isocyanate and hydroxyl-containing moieties Soft, flexible products are obtained when long flexible chains separate the reacting groups. Such hydroxyl-containing materials as castor oil, polyethers and hydroxyl-terminated polyesters are preferred.

Vinyl plastisols are also applicable as an elastomeric member in which is incorporated one of the alkaline earth oxides. Although possibly limited to a maximum use temperature of about 125° C, they are quite versatile materials and low in cost. One desirable feature is their low viscosity before gelling or converting to an elastomer. This allows a large amount of the desiccant oxide to easily be incorporated in the material. The vinyl plastisol systems usually are simply a vinyl polymer such as polyvinyl chloride often copolymerized with minor amounts of other monomers such as vinyl acetate, acrylates and the like to impart specific properties such as solubility, physical durability, adhesion. The vinyl resin in a fine powder form is mixed with a plasticizer liquid such as dibutyl phthalate, dioctyl phthalate, polymeric esters, or many others. To produce the plastisol or elastomer it is only necessary to stir the finely powdered vinyl compound into the plasticizer and heat to get the combination. The gelling or elastomerizing mechanism is generally the dissolution and swelling of the vinyl particles by the plasticizing agent.

The alkaline earth oxide is about 5 to about 80 percent, by weight, of the desiccant means, the remainder the elastomeric matrix. A trace to about 1 percent of submicron silicon dioxide may be used to maintain the alkaline earth oxide suspended in the elastomeric matrix prior to solidification thereof. This may be advantageous for smaller amounts of oxide in low viscosity liquids.

Referring now to the enlarged cross-sectional view illustrated in FIG. 1 of the drawing, the elastomeric desiccant means is indicated by the reference numeral 10. The elastomeric means comprises a plurality of alkaline earth oxide particles 11 dispersed in an elastomeric matrix 12. The alkaline earth oxide is selected from the group consisting of calcium oxide, strontium oxide and barium oxide. The matrix 12 is selected from the above mentioned elastomers such as, for example, the silicone elastomers and more particularly the silicone potting resins and the like. The matrix must be elastomeric in order to prevent flaking and/or rupturing as the alkaline earth oxide expands during absorption of a fluid such as water vapor and other gases.

In further describing the characteristics of the elastomer-alkaline earth oxide desiccant the following parts are pertinent. There are many variations of elastomeric silicones in current use. Generally, they employ a liquid siloxane base to which is added a small amount of a catalyst (about 10%) which is also usually a liquid. Depending upon the chemistry of the system, conversion to an elastomeric solid may be effected by allowing to stand at room temperature for a few hours. In other compositions, conversion to a solid may be effected within 5 minutes by subjecting the composition to elevated temperatures. Other compositions will convert to a solid after a few minutes standing at room temperature. The preferred composition for this application, where it is desired to prepare a molded desiccant means, in one which will convert quickly at room or elevated temperatures to lessen the possibility of prolonged exposure to air. Molded forms are quickly removed from the molds and transferred to strictly dry air storage for further use. Reasonably quick conversion is also desirable to minimize settling of the oxide powder in the liquid carrier. In many applications, particularly where it is desirable to inject the liquid into a device container immediately before closing, a composition having a lone "pot-life" is desirable. In this case, the container from which the liquid carrying the alkaline earth oxide is dispensed must offer good protection from the air. The quantity of liquidus mixture dispensed into the device may be converted to the elastomeric condition by allowing to stand or by heating for quick conversion.

The siloxane elastomers inherently have a moderate degree of adhesion to clean surfaces to which they are applied and cured to the solid elastomer. This adhesive property is lessened however when the alkaline earth oxide is incorporated therein. In those applications where it is desired or required that the elastomeric desiccant composition adhere firmly to surfaces to which it is applied as a liquid and later converted to an elastomer solid, an adequate degree of adhesion can be achieved by various means. One way is to employ a reduced amount of catalyst. This will result in a soft tacky elastomer having excellent adhesive properties. Another method to obtain good adhesion is to apply a silicone "primer" to the cleaned surface. When the siloxane elastomer desiccant means is applied to this surface as a liquid and subsequently converted to the solid, a high degree of adhesion results. Still another method is to apply a silicone preparation known as "silicone adhesive" to the surface. To this the elastomeric desiccant composition will adhere tenaciously.

In other applications the adhesive property is not required or desired for the composition. This is particularly the case in molding special shapes. In this case it is necessary to apply a mold lubricant or release agent to prevent the molded forms from adhering to the mold.

Barium oxide is known to be one of the most powerful desiccant agents. For example, barium oxide will reduce the moisture content of air to a value as low as 0.00065 milligrams per liter. Likewise, calcium oxide and strontium oxide have strong desiccating properties but to a lesser degree than barium oxide. Calcium oxide will reduce water vapor in air to 0.003 milligrams per liter. The desiccating capacity of strontium falls between barium oxide and calcium oxide.

As disclosed hereinbefore, the porous powders of alkaline earth oxides possess a high affinity for moisture and water vapor contained within the ambient air thereby presenting problems when used unless precautions are taken. The main difficulty in the use of an alkaline earth oxide as a desiccant is that a substantial portion of the desiccating capacity of the alkaline earth oxide may be dissipated during normal handling, measuring and the like and delays generally encountered before the electrical or electronic device is hermetically sealed. The aforementioned loss of desiccating capacity is aggravated if the humidity of the ambient air is high. Table I illustrates the relative rates of desiccation of the three metal oxide powders to selected percentages of weight increase at room temperature in still air having 67% relative humidity. It will be observed that the rate of weight increase is a function of desiccant strength. To insure comparative values of the time duration required for a given weight increase, still air was employed. The time duration would be much shorter with circulated air because moisture would be brought in contact with the oxides at a much faster rate.

TABLE I

| Desiccant | Weight of powder (gms) | Hours to 6% increase | Hours to 12% increase |
| --- | --- | --- | --- |
| BaO | .7 | .8 | 2.5 (11.7%) |
| SrO | .8 | 1.75 | 3. |
| CaO | .7 | 12. | 18. |

When reacting with moisture or water vapor contained within the ambient air, the particular alkaline earth oxide is converted to its hydroxide and the following values represent the maximum theoretical percentage of weight increase when the alkaline earth oxide is converted to its hydroxide.

| | |
|---|---|
| BaO + H$_2$O →Ba(OH)$_2$ | 11.7% weight increase |
| SrO + H$_2$O →Sr(OH)$_2$ | 17.4% weight increase |
| CaO + H$_2$O →Ca(OH)$_2$ | 32.6% weight increase |

The oxides of barium and strontium will absorb moisture or water vapor beyond that required to form the hydroxide thereof, however, the absorption of moisture water vapor is as water of hydration and is loosely retained by the alkaline earth. The water of hydration retained by the barium and the strontium is released at temperatures at about 75° C or above. Water of hydration is prevented from forming by using sufficient amounts of the oxides of barium and strontium is the desiccant means, so that after absorption of all water vapor within the enclosure some barium or strontium oxide remains.

As shown in Table I, barium oxide is converted to barium hydroxide in about 2.5 hours, strontium oxide is converted to strontium hydroxide in about 3 hours and calcium oxide is converted to calcium hydroxide in about 18 hours. It is seen, therefore, that of the alkaline earth oxides, barium oxide is the most powerful desiccant and that calcium oxide is the least powerful desiccant of the alkaline earths.

One might expect that the elastomeric matrix material would afford very slow water vapor transmission taking as long as perhaps several days or several weeks for the water vapor to diffuse through the elastomer matrix and convert the oxide to a hydroxide. However, it was found that the water vapor did not require several weeks or even several days to diffuse through the elastomer matrix. It was found that the rate of water vapor was not decreased to the extent that the desiccating properties of the alkaline earth oxide was severely impaired but rather that the rate is decreased modestly. It was found that by using an elastomer matrix the rate of absorption by the alkaline earth particles dispersed therein fell in a general range which is most desirable from the standpoint of practical utility. Furthermore, the reduced rate of desiccation does not impair the extent to which the composition will absorb moisture, water vapor or deleterious gases present in the hermetic enclosure. In addition, varying the ratios of elastomer matrix to alkaline earth oxide particles was found to have little effect on the rate of desiccation. It was found that about 5 to about 80 percent, by weight, of alkaline earth oxide, the remainder an elastomeric matrix provided a satisfactory desiccant means. Less than 5 percent, by weight, of alkaline earth oxide, the remainder an elastomeric matrix provided a desiccant means having less than ideal desiccating capacity in relation to the size of the desiccant means. However, the desiccating capacity and rate of the individual particles in the 5 percent, by weight, alkaline earth oxide desiccant means remained substantially unaltered. In addition, during the preparation of a desiccant means containing less than 5 percent, by weight, alkaline earth oxide, the oxide suffers a noticeable loss of desiccating capacity.

Due to density differences of the three oxides and their corresponding hydroxides, the maximum amounts of the oxides which can be incorporated in the elastomer on a weight basis will be somewhat different. The higher the density of the oxide the more that can be incorporated in the elastomer. Conversely, the lower the oxide density (greater bulk per unit weight) the less weight on a percentage basis it is possible to employ. In the resulting elastomeric desiccating means, however, this factor is largely cancelled out by the fact that the desiccating capacity of the oxides in inversely proportional to their density.

The following table gives the density of the three oxides and their resulting hydroxides.

TABLE II

| Oxide | Density | Hydroxide | Density |
|---|---|---|---|
| BaO | 5.72 | Ba(OH)$_2$ | 5.3 |
| SrO | 4.7 | Sr(OH)$_2$ | 3.62 |
| CaO | 3.34 | Ca(OH)$_2$ | 2.24 |

As to the percentage of alkaline earth oxide used in the elastomer, in general, the practice is to employ the highest amount of the oxide consistent with good handleability. A high proportion of the oxides makes for a high desiccating capacity for the lowest volume of the elastomer desiccant means. The maximum percentage of oxide is governed largely by the physical condition of the elastomer desiccant means after absorbing sufficient water vapor to convert the oxide to the hydroxide. If an excessive weight of oxide particles to matrix is used to fabricate the elastomeric desiccant means, then upon conversion of the oxide to hydroxide sufficient expansion of the means occurs so that it loses strength and elastic properties and sheds portions thereof. It was found that about 80 percent, by weight, barium oxide, about 70 percent, by weight, of strontium oxide, and about 60 percent, by weight, calcium oxide represented the upper limit of the alkaline earth oxide to elastomeric matrix of the desiccant means.

A trace to about 1.0 percent, by weight, preferably about 0.5 percent, by weight, submicron silicon dioxide or other suitable material may be used in the matrix in order to assist in maintaining the alkaline earth oxide suspended in the elastomeric matrix when the matrix is in a liquidus phase. A particle size larger than 80 mesh may then be used, but frequent or continuous agitation is required to maintain the oxide in a reasonable uniform suspension while the elastomeric phase is in the liquid condition. The settling out of the oxide particles contained in the liquidus matrix is less of a problem the higher the percentage of oxide particles to elastomeric matrix.

Referring again to FIG. 1, it will be noted that the alkaline earth oxide particles 11 are dispersed in a random fashion throughout the elastomer matrix. If the metal oxide particles are in abutting relationship, as in the case with loose powder in ambient air, the rate of absorption of the water vapor and other deleterious gases is at a much higher rate than if the individual particles are randomly dispersed in an elastomer matrix so that only a few of the total number of particles are in direct contact with ambient air. A coating of elastomeric film over the individual particles contained within the elastomeric matrix will reduce the transferal of absorbed moisture and other deleterious gases from a particle exposed to the ambient air and imbedded in or carried by the elastomeric matrix. As shown in FIG. 1 a small number of alkaline earth oxide particles in relationship to the total number of alkaline earth oxide particles are adjacent the surfaces of the desiccant means. Therefore, by way of example, the alkaline earth particle 11' at the surface of the desiccant means and in direct contact with the ambient air will initiate absorption of water vapor and/or deleterious gases before adjacent particles 11" will initiate absorption thereof. It is thought, that the water vapor or deleterious gases absorbed by particle 11' will, to some degree, be transmitted to particle 11" thereby significantly reducing the combined rate at which the two particles 11' and 11" will absorb water vapor and/or deleterious gases when compared to the condition when both particles are exposed at the same instant of time to water vapor and/or said deleterious gases as in the case of loose powder. Upon transmittal of the moisture, water vapor or deleterious gas to the adjacent particle 11", particle 11' is able to absorb additional moisture from the air contained within the enclosure. It is thought, that this "chain reaction" phenomenon occurs throughout the elastomeric desiccant means.

FIG. 2 shows an embodiment of an hermetically encapsulated electronic device using the elastomeric desiccant means. The desiccant means may be used with a gasketed or non-hermetically sealed device. For illustrative purposes only, an hermetically sealed device is illustrated. An electronic assembly 20 includes a tubular case 21 having a closed end 22 and an open end 23. The tubular case 21 may be fabricated from any suitable metallic material such as stainless steel or the like. A cylindrical pre-formed liner 23 is disposed in abutting relationship with regard to the inside diameter of tubular case 21 as shown in FIG. 2. The liner 23 is fabricated from any suitable electrically non-conductive material such as rubber or the like. Electronic device cells 24 and 25 are disposed in stacked relationship as shown in FIG. 2. Positioned between cell 24 and the closed end 22 of the tubular casing is a metallic spring washer.

A terminal assembly 30 closes the open end of the tubular case 21. The terminal assembly includes a flanged collar 31 having an axial bore through which the terminal pin 32 projects. The insulating means 33, fabricated from any suitable insulating material such as glass or the like, is joined by fusion with flanged collar 31 and the terminal pin 32 to thereby form a glass to metal hermetic seal. Abutting the bottom extremity of the terminal pin 32 is finger 35 of contact disc 34. The finger is fixedly attached to the terminal pin by any suitable means such as by soldering, welding and the like. The contact disc and the terminal pin are fabricated from any suitable metallic material such as spring steel or the like. An insulative washer 36 affords electric insulation between the flanged collar 31 and the contact disc 34. The insulative washer may be fabricated from mica and the like. The open end of the tubular case 21 is crimped over the flanged collar as shown in FIG. 2. The crimped portion of the tubular case welded, soldered or the like to the flanged collar to thereby fixedly retain the flanged collar as shown in FIG. 2. Elastomeric desiccant means 37 and 38 are fabricated in ring form are seated around cells 24 and 25 as shown in FIG. 2. It is pointed out that the hermetic enclosure retaining the electronic devices 24 and 25 illustrated in FIG. 2 is for descriptive purposes only. It will be recognized that the hermetic enclosure may be of any suitable form of which many are conventionally used. As such, illustrations of various types of other hermetic enclosures with which the elastomeric desiccant may be used have been omitted from the drawings in the interest of a clearer showing of the inventive elastomeric desiccant means.

FIGS. 3 and 4 respectively show elastomeric desiccant means 40 and 50. The elastomeric desiccant means 40 has been shown to be an apertured, disc-shaped means which facilitates its utilization with devices having a means which must project through the desiccant means. The elastomeric desiccant means 50 is shown to be disc-shaped. It should be obvious to those possessing ordinary skill in the art that the shape of the elastomeric desiccant means is practically unlimited. For practical usage, however, the shape of the elastomeric desiccant is only limited by the confines of the hermetic enclosure in which the elastomeric desiccant means is to be used.

EXAMPLE I

In this example, "Sylgard" 182 was chosen to conduct various composition and desiccating tests primarily because of its low viscosity. A series of compositions were made using all three of the alkaline earth oxides and in various ratios of elastomer to oxide. Weight gain tests were made by exposing the specimens to a constant humidity. All specimens were made by mixing 10% of the catalyst solution in to 90% of the liquid base then, quickly stirring in the desired amount of alkaline earth oxide and pouring this in a mold. This was placed in a 150° C oven for 15 minutes after which the composition had converted to an elastomeric body. In all tests with the elastomeric desiccating means substantially the same body size and composition was used. A ¼ inch thick by ¾ inch diameter disc of the elastomeric desiccant was used. The percentage increase in weight is based on the alkaline earth oxide content of the elastomer desiccant means rather than on the weight of the elastomer desiccant means.

Comparative desiccating tests are reported in Table III, IV and V.

In these tables data is given to show the following:

1. Comparisons of the time durations required for a 6% and a 12% weight increase starting with substantially the same weights of the alkaline earth oxide.

2. Comparisons of the time durations required for a 6% and a 12% weight increase of the same weights of alkaline earth oxide as in (1) but incorporated in a silicone elastomer matrix.

3. Comparisons of the time duration required for a 6% and 12% weight increase being different weight ratios of the alkaline earth oxides disposed within a silicone elastomer matrix.

It should be noted that all the tests were made in still air having a 67% relative humidity at room temperature. In a circulated air environment, the time durations would be less for the elastomeric compositions but considerably less in the case of the alkaline earth oxide in loose powder form.

TABLE III

| | (Barium Oxide) | | |
|---|---|---|---|
| Desiccant | Wt. grams | Hours for 6% Wt. increase | Hours for 12% Wt. increase |
| BaO powder | 4.5 | 2 | 6 |
| BaO powder | 2.2 | .7 | 2.5 |
| BaO powder | .7 | .8 | 2.5 |
| 3 BaO + 1 Silicone | 4.4 | 7.5 | 18 |
| 2 BaO + 1 Silicone | 2.0 | 8 | 17 |
| 1 BaO + 2 Silicone | .7 | 6 | 16 |

TABLE IV

| | (Strontium Oxide) | | |
|---|---|---|---|
| Desiccant | Wt. grams | Hours for 6% Wt. increase | Hours for 12% Wt. increase |
| SrO powder | 2.2 | 3 | 6 |
| SrO powder | 1.3 | 2 | 5 |
| SrO powder | .8 | 1.75 | 3 |
| 2 SrO + 1 Silicone | 2.2 | 7.5 | 15 |
| 1 SrO + 1 Silicone | 1.3 | 7.5 | 18 |

TABLE IV-continued
(Strontium Oxide)

| Desiccant | Wt. grams | Hours for 6% Wt. increase | Hours for 12% Wt. increase |
|---|---|---|---|
| 1 SrO + 2 Silicone | .75 | 6.5 | 19 |

TABLE V
(Calcium Oxide)

| Desiccant | Wt. grams | Hours for 6% Wt. increase | Hours for 12% Wt. increase |
|---|---|---|---|
| CaO powder | 1.3 | 12 | 18 |
| CaO powder | .7 | 12 | 18 |
| 1 CaO + 1 Silicone | 1.3 | 28 | 52 |
| 1 CaO + 2 Silicone | .7 | 22 | 51 |

EXAMPLE II

Three commercial silicone RTV compositions were selected, namely Dow Corning Corporation 3110 having a viscosity of 12,500 centipoises at 25° C, 3112 having a viscosity of 30,000 centipoises at 25° C and 3120 also having a viscosity of 30,000 centipoises at 25° C. The mixtures were prepared by stirring 50 parts of BaO into 45 parts of resin base, then stirring in 5 parts of catalyst base (which contained stannous octoate). Thus, the BaO content of each mix was 50% by weight. The mixtures were poured into molds and allowed to cure at room temperature in a desiccator over Barium Oxide. After curing, the specimens were weighed, then transferred to a chamber containing air controlled at 50% R.H. at room temperature. Weight increase due to moisture absorption will be found in Table VI.

TABLE VI

| RTV Rubbers Containing 50% BaO | % Wt. increase in 30 hrs. at 50% R.H. at R.T. | Theoretical % wt. increase to BA(OH)$_2$ |
|---|---|---|
| 3110 | 4.6 | 5.8 |
| 3112 | 4.7 | 5.8 |
| 3120 | 5.1 | 5.8 |

EXAMPLE III

In this example tests were conducted using a typical commercial polyurethane product "Uniroyal Vibrathane A-735" produced by the Chemical Division of the Uniroyal Corporation. This is a polyether-cured polyurethane rubber, and is a two part system. Part "A", having a brown pigment, is used at 89% in the mix. Part "B" is a clear liquid and is used at 11%. The viscosities of the mixture of the two parts was 1,500 centipoises at 25° C. Three mixes of the two parts were made in the above ratios. To one an equal weight of barium oxide was stirred in and to a second mix, two times its weight of barium oxide was stirred in to yield a composition having about 66% of the oxide. No BaO was added to the third. Each mix was poured into separate molds and transferred to a 110° C oven. After 20 minutes all three had converted to an elastomeric solid. After cooling, each was weighed and placed in a chamber having a constant humidity of 50%. Weight increases due to moisture absorption will be formed in Table VII.

TABLE II

| % BaO in polyurethane elastomer | % wt. increase in 20 hours at R.T. at 50% R.H. | Theoretical % increase in wt. to Ba(OH)$_2$ |
|---|---|---|
| none | .67 | — |
| 50% | 5.4 | 5.8 |
| 66% | 6.3 | 7.8 |

EXAMPLE IV

In this example, a typical commercial vinyl plastisol was employed. The vinyl resin used, produced by the Union Carbide Corporation, was designated AYKV-2. This is a very finely divided powder of polyvinyl chloride. Forty parts by weight of this was stirred into 60 parts by weight of dioctyl phthalate plasticizer. The resulting suspension had a viscosity at 25° C of 1,900 centipoises. Into one portion of this was stirred in an equal weight of barium oxide, into another portion was stirred twice its weight of barium oxide to give a composition having about 66% BaO, and no barium oxide was added to a third. These suspensions were poured into metal molds heated to about 150° C. After about 5 minutes each was transformed into an elastomeric body which was cooled, removed from the mold, weighed and subjected to a constant 50% relative humidity atmosphere to determine the moisture absorption. These results will be found in Table VIII.

TABLE VIII

| % BaO in vinyl plastisol elastomer | % wt. increase in 20 hrs. at R.T. at 50% R.H. | Theoretical % increase in wt. to Ba(OH)$_2$ |
|---|---|---|
| none | .15 | — |
| 50% | 1.8 | 5.8 |
| 66% | 2.6 | 7.8 |

The present invention is not intended to be limited to the disclosure herein and changes and modifications may be made in the disclosure by those skilled in the art without departing from the spirit and scope of the novel concepts of this invention. Such modifications and variations are considered to be within the purview and scope of this invention and the appended claims.

Having thus described my invention, I claim:

1. An elastomeric desiccant means for use in a closure containing an electrical component, the elastomeric desiccant consisting essentially of a dehydrating agent selected from fluid absorbing alkaline earth oxide particles having a particle size not greater than about 80 mesh dispersed in an elastomeric matrix material having the property of retarding the rate of fluid absorption of the alkaline earth particles, the elastomeric material having a viscosity not greater than about 50,000 centipoises at the time of introduction of the alkaline earth oxide to the elastomeric material, the elastomeric material being selected from the group consisting of silicon RTV rubbers, vinyl plastisols, polyurethane rubbers, and silicon potting and encapsulating materials containing recuring siloxane units, the alkaline earth oxide constituting about 5 to about 80 percent by weight of the elastomeric desiccant means.

2. A method of desiccating a closure containing an electrical device comprising the steps of providing within an electrical device enclosure a desiccant consisting essentially of a dehydrating agent selected from particulate alkaline earth oxides having a particle size not greater than about 80 mesh in an amount of from about 5 to 80 percent by weight dispersed in an elastomeric matrix material having the property of retarding the rate of fluid absorption of alkaline earth oxides, the elastomeric material being selected from the group consisting of silicone potting and encapsulating materials containing recuring siloxane units, silicone RTV rubbers, vinyl plastisols, and polyurethane rubbers, the elastomeric matrix material having at the time of introduction of the alkaline earth oxides a viscosity of not greater than about 50,000 centipoises, and the alkaline earth oxides absorbing fluid within the device enclosure.

3. The method of claim 2 in which the elastomeric material has a viscosity of not greater than about 30,000 centipoises at the time of introduction of said alkaline earth oxide.

4. The method of claim 2 in which the alkaline earth oxide is selected from the group consisting of barium oxide, strontium oxide, calcium oxide and mixtures thereof.

5. The method of claim 2 in which the alkaline earth oxides dispersed in the elastomeric matrix material is introduced into the enclosure of the electronic device prior to polymerization of the elastomeric material.

6. The method of claim 2 in which the alkaline earth oxides dispersed in the elastomeric matrix material is introduced into the enclosure of the electronic device after polymerization of the elastomeric material.

7. The desiccant means according to claim 1 in which the elastomeric material has a viscosity not greater than about 30,000 cetipoises centipoises at the time of introduction of the alkaline earth oxide.

8. The desiccant means according to claim 1 in which the alkaline earth oxide is selected from the group consisting of barium oxide, strontium oxide, calcium oxide and mixtures thereof.

9. The desiccant means according to claim 8 in which the alkaline earth oxide is barium oxide.

10. The desiccant means according to claim 9 in which the elastomeric material is a silicone potting resin.

* * * * *